(12) United States Patent
Gerard et al.

(10) Patent No.: US 7,984,220 B2
(45) Date of Patent: Jul. 19, 2011

(54) EXCEPTION TRACKING

(75) Inventors: Scott N. Gerard, Rochester, MN (US); Richard Allen Saltness, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 10/932,733

(22) Filed: Sep. 2, 2004

(65) Prior Publication Data

US 2006/0095812 A1    May 4, 2006

(51) Int. Cl.
*G06F 13/00* (2006.01)
*G06F 9/44* (2006.01)

(52) U.S. Cl. .................... 710/302; 717/126
(58) Field of Classification Search .......... 710/302; 717/126, 127; 714/38
See application file for complete search history.

(56) References Cited

U.S. PATENT DOCUMENTS

| | | | | |
|---|---|---|---|---|
| 5,761,407 A * | 6/1998 | Benson et al. | | 714/37 |
| 5,761,513 A * | 6/1998 | Yellin et al. | | 717/127 |
| 5,935,238 A * | 8/1999 | Talcott et al. | | 712/206 |
| 5,948,112 A * | 9/1999 | Shimada et al. | | 714/16 |
| 6,044,460 A * | 3/2000 | Eckner et al. | | 712/244 |
| 6,367,036 B1 * | 4/2002 | Hansen | | 714/45 |
| 6,480,886 B1 * | 11/2002 | Paice | | 709/208 |
| 6,493,834 B1 * | 12/2002 | Bates et al. | | 714/38 |
| 6,931,355 B2 * | 8/2005 | Farrell et al. | | 702/187 |
| 7,003,762 B2 * | 2/2006 | Krueger | | 717/126 |
| 7,003,778 B2 * | 2/2006 | Sokolov | | 719/318 |
| 7,086,066 B2 * | 8/2006 | Kappel et al. | | 719/318 |
| 7,165,190 B1 * | 1/2007 | Srivastava et al. | | 714/38 |
| 2004/0133823 A1 * | 7/2004 | Swoboda et al. | | 714/39 |
| 2004/0148594 A1 * | 7/2004 | Williams | | 717/158 |
| 2004/0225799 A1 * | 11/2004 | Leaming | | 710/301 |
| 2005/0028145 A1 * | 2/2005 | Kang et al. | | 717/128 |
| 2005/0086664 A1 * | 4/2005 | Sundaresan et al. | | 719/312 |
| 2006/0036893 A1 * | 2/2006 | Anglin et al. | | 714/4 |

* cited by examiner

*Primary Examiner* — Mark Rinehart
*Assistant Examiner* — Christopher A Daley
(74) *Attorney, Agent, or Firm* — Owen J. Gamon

(57) ABSTRACT

A method, apparatus, system, and signal-bearing medium that, in an embodiment, log trace data in response to an exception if the exception meets a filter criteria and create quality data from the trace data if a class in a call stack associated with the exception is owned by a user defined in a user table. In an embodiment, the quality data includes an identification of the user, a count of a number of times the exception was encountered by the user, and an identification of the exception. In various embodiments, the filter criteria may be an exception type, classes that initiate the exception, or packages that contain the classes that initiate the exception.

14 Claims, 5 Drawing Sheets

152

TRACE DATA

| 215 | 220 | 225 | 230 | 235 |
|---|---|---|---|---|
| EXCEPTION TYPE | CALL STACK | ARGUMENTS | TIMESTAMP | MEMORY SIZE |
|  |  |  |  |  |
|  |  |  |  |  |

QUALITY DATA 158

| USER ID 320 | EXCEPTION ID 325 | COUNT 330 | |
|---|---|---|---|
| USER A | EXCEPTION A | 10 | 305 |
| USER A | EXCEPTION B | 11 | 310 |
| USER B | EXCEPTION C | 20 | 315 |

FIG. 3

EXCEPTION TRACKING

FIELD

An embodiment of the invention generally relates to computer software. In particular, an embodiment of the invention generally relates to tracking exceptions generated by computer software.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware components (such as semiconductors, integrated circuits, programmable logic devices, programmable gate arrays, power supplies, electronic card assemblies, sheet metal, cables, and connectors) and software, also known as computer programs.

During the course of performing operations, computer programs may encounter errors, failures, or other abnormal conditions, which cause the computer program to generate an exception. For example, data may be temporarily unavailable or locked for use by another program, a computer system or network may be slow or unavailable due to a high load, or a file may not be found.

Some exceptions may be expected while others are unexpected, the success or failure of an operation may be subjective, an exception that one program considers successful another program may consider a failure, and the program that generates an exception may not be the root of the problem; instead, the problem may be in the way that the program was invoked. For example, a utility that opens files may report two different conditions: that the file was found and opened, or the file was not found. Both conditions might not be considered failures to the open utility because it performed its job correctly. Similarly, the program that invokes the open utility may simply create the file if it does not exist, so the invoking program also does not consider the file-not-found condition to be a failure. But, another program that invokes the open utility might interpret the file-not-found condition to mean that important data has been lost, so the operation cannot continue. Thus, merely knowing that an open utility reported a file-not-found exception is not enough information to determine the source of the problem, or even if a problem exists at all.

Because some exceptions may indicate problems that need to be fixed while others do not, and the program that generates the exception may not be the source of the problem, if a problem even exists at all, users need a better way to track exceptions and to understand the source and cause of exceptions.

SUMMARY

A method, apparatus, system, and signal-bearing medium are provided that, in an embodiment, log trace data in response to an exception if the exception meets a filter criteria and create quality data from the trace data if a class in a call stack associated with the exception is owned by a user defined in a user table. In an embodiment, the quality data includes an identification of the user, a count of a number of times the exception was encountered by the user, and an identification of the exception. In various embodiments, the filter criteria may be an exception type, classes that initiate the exception, or packages that contain the classes that initiate the exception.

BRIEF DESCRIPTION OF THE DRAWING

FIG. 2 depicts a block diagram of an example data structure for trace data, according to an embodiment of the invention.

FIG. 3 depicts a block diagram of an example data structure for quality data, according to an embodiment of the invention.

DETAILED DESCRIPTION

Figure 1:
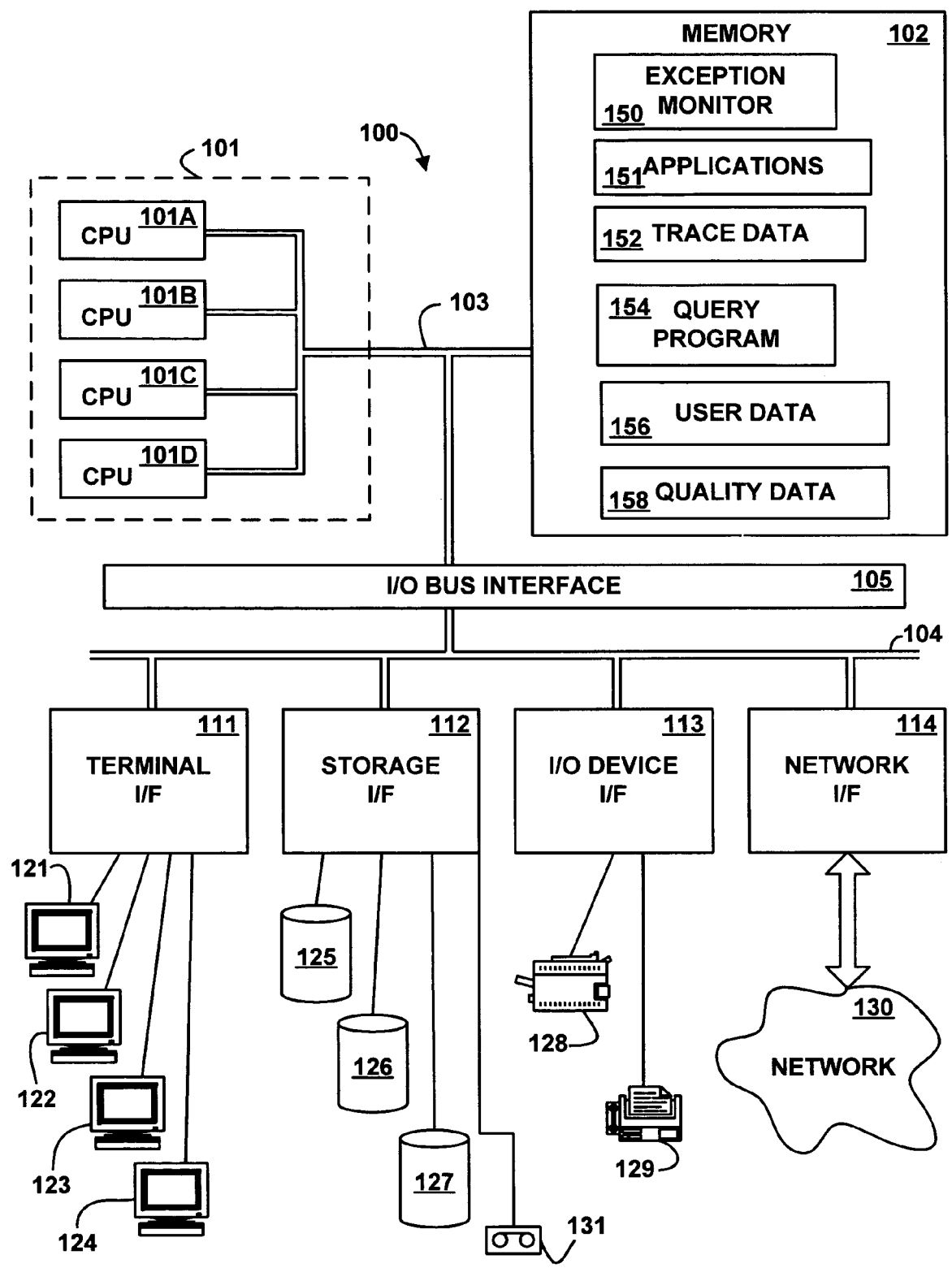
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a network 130, according to an embodiment of the present invention. The major components of the computer system 100 include one or more processors 101, main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment, the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes an exception monitor 150, applications 151, trace data 152, a query program 154, user data 156, and quality data 158. Although the exception monitor 150, the applications 151, the trace data 152, the query program 154, the user data 156, and the quality data 158 are illustrated as being contained within the memory 102 in the computer system 100, in other embodiments, some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the exception monitor 150, the applications 151, the trace data 152, the query program 154, the user data 156, and the quality data 158 are all illustrated as being contained within the memory 102 in the computer system 100, these elements are not necessarily all completely contained in the same storage device at the same time.

The exception monitor 150 monitors for exceptions from the applications 151 and, in response, saves information regarding the exceptions to the trace data 152 if a trace function is enabled. The applications 151 may be any executable or interpretable code, whether part of an operating system, a user program, or a third party program. The trace data 152 is further described below with reference to FIG. 2. The query program 154 interrogates the trace data 152 and creates the quality data 158 describing the exceptions from the applications 151 based on the user data 156. The user data 156 identifies users that own classes used by the applications 151. The quality data 158 is further described below with reference to FIG. 3.

In an embodiment, the exception monitor 150 and the query program 154 include instructions capable of executing on the processor 101 or statements capable of being interpreted by instructions executing on the processor 101 to perform the functions as further described below with reference to FIGS. 4 and 5. In another embodiment, the exception monitor 150 and/or the query program 154 may be implemented in microcode. In yet another embodiment, the exception monitor 150 and/or the query program 154 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiments, many other such devices may exist, which may be of differing types.

The network interface 114 provides one or more communications paths from the computer system 100 to other digital devices and computer systems, e.g., the client 132; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact, the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments, some or all of the I/O devices are connected directly to one or more system I/O buses.

The computer system 100, depicted in FIG. 1, has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In an embodiment, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line, cable, or bus. In another embodiment, the network 130 may support the Ethernet IEEE (Institute of Electrical and Electronics Engineers) 802.3x specification.

In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the trace data 152, according to an embodiment of the invention. The trace data 152 includes records 205 and 210, but in other embodiments any number of records with any appropriate data may be present. Each of the records includes an exception type field 215, a call stack field 220, an arguments field 225, a timestamp field 230, and a memory size field 235, but in other embodiments more or fewer fields may be present.

The exception type 215 indicates the type of exception that was generated by the application 151. Examples of exception types are file not found, invalid address, authority violation, or any other appropriate exception type, including expected exceptions, unexpected exceptions, recoverable exceptions, and unrecoverable exceptions.

The call stack 220 includes the contents of the call stack, invocation stack, or program stack at the time that the exception occurred. The call stack 220 may include entries for various programs, subroutines, or methods that are linked together as a result of them calling each other within the same job, process, or thread. Each entry may include, for example, pointers to the programs, subroutines, or methods, and their respective internal storage and/or passed parameters. Each entry may further include information regarding the classes associated with the programs, subroutines, or methods.

The arguments 225 may include parameters that were passed to the application 151 and/or internal data structures that were in use by the application 151 at the time that the exception occurred. The timestamp 230 indicates the time and/or data that the respective record was created. The memory size 235 indicates the size of memory (e.g., a portion of the memory 102) that was allocated to the application 151 at the time the exception occurred.

FIG. 3 depicts a block diagram of an example data structure for the quality data 158, according to an embodiment of the invention. The quality data 158 is created by the query program 154 based on the trace data 152 and the user data 156. The quality data 158 includes records 305, 310, and 315, but in other embodiments any number of records with any appropriate data may be present. Each of the records includes a user identification field 320, an exception identifier field 325, and a count field 330, but in other embodiments more or fewer fields may be present.

The user identification 320 identifies a user, listed in the user data 156, that owns classes used by the application 151 that generated the exception associated with the respective exception identifier 325. The exception identifier 325 identifies an exception and corresponds to the exception type 215 in the trace data 152. The count 330 indicates the number of times the respective exception identifier 325 was encountered by the application 151 while the class that generated the exception was owned by the user 320.

Figure 4:
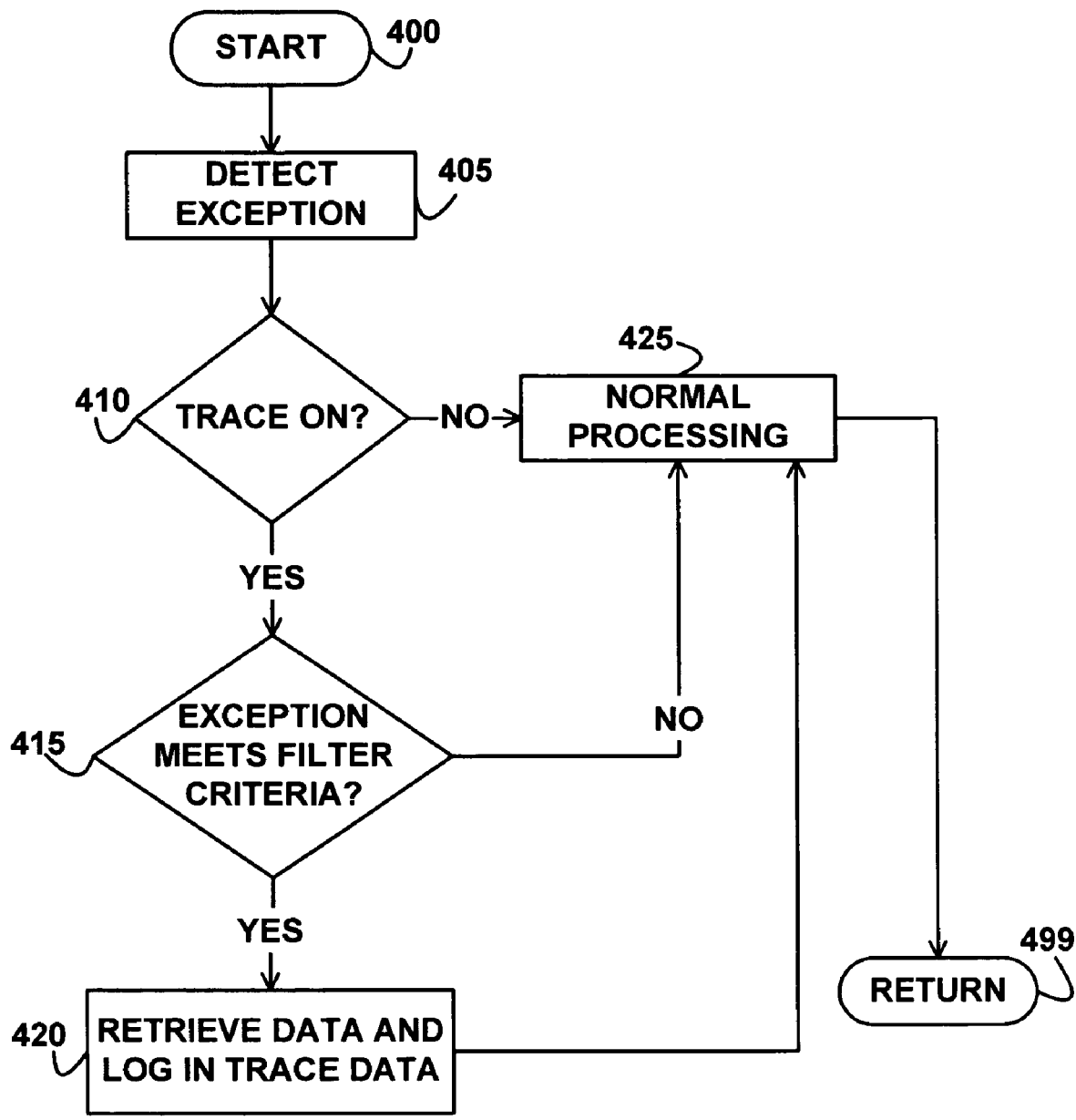
FIG. 4 depicts a flowchart of example processing for an exception monitor, according to an embodiment of the invention.

FIG. 4 depicts a flowchart of example processing for the exception monitor 150, according to an embodiment of the invention. Control begins at block 400. Control then continues to block 405 where the exception monitor 150 detects an exception generated by the application 151. Control then continues to block 410 where the exception monitor 150 determines whether a trace function is enabled for the application 151.

If the determination at block 410 is true, then the trace function is enabled, so control continues to block 415 where the exception monitor 150 determines whether the exception meets a filter criteria. In various embodiments, the filter criteria comprises inclusion or exclusion of certain exception types, classes or methods that initiated the exception, or packages or files that contain the classes or methods that initiated the exception. In various embodiments, the filter criteria may be specified by a user interface, programmatically, or via any other appropriate technique.

If the determination at block 415 is true, then the exception meets the filter criteria, so control continues to block 420 where the exception monitor 150 continues to block 420 where the exception monitor 150 retrieves the call stack associated with the application 151 that generated the exception, retrieves any arguments passed to the application 151 or method in the application 151, retrieves the time and/or data that the exception occurred, retrieves the size of the memory allocated to the application 151 and logs the retrieved data in the trace data 152, as previously described above with reference to FIG. 2. Control then continues to block 425 where the exception monitor 150 performs any further normal exception processing. Control then continues to block 499 where the logic of FIG. 4 returns.

If the determination at block 415 is false, then the exception does not meet the filter criteria, so control continues to block 425, as previously described above.

If the determination at block 410 is false, then the trace function is not enabled, so control continues to block 425 where the exception monitor 150 performs normal processing for the received exception. Control then continues to block 499 where the logic of FIG. 4 returns.

Figure 5:
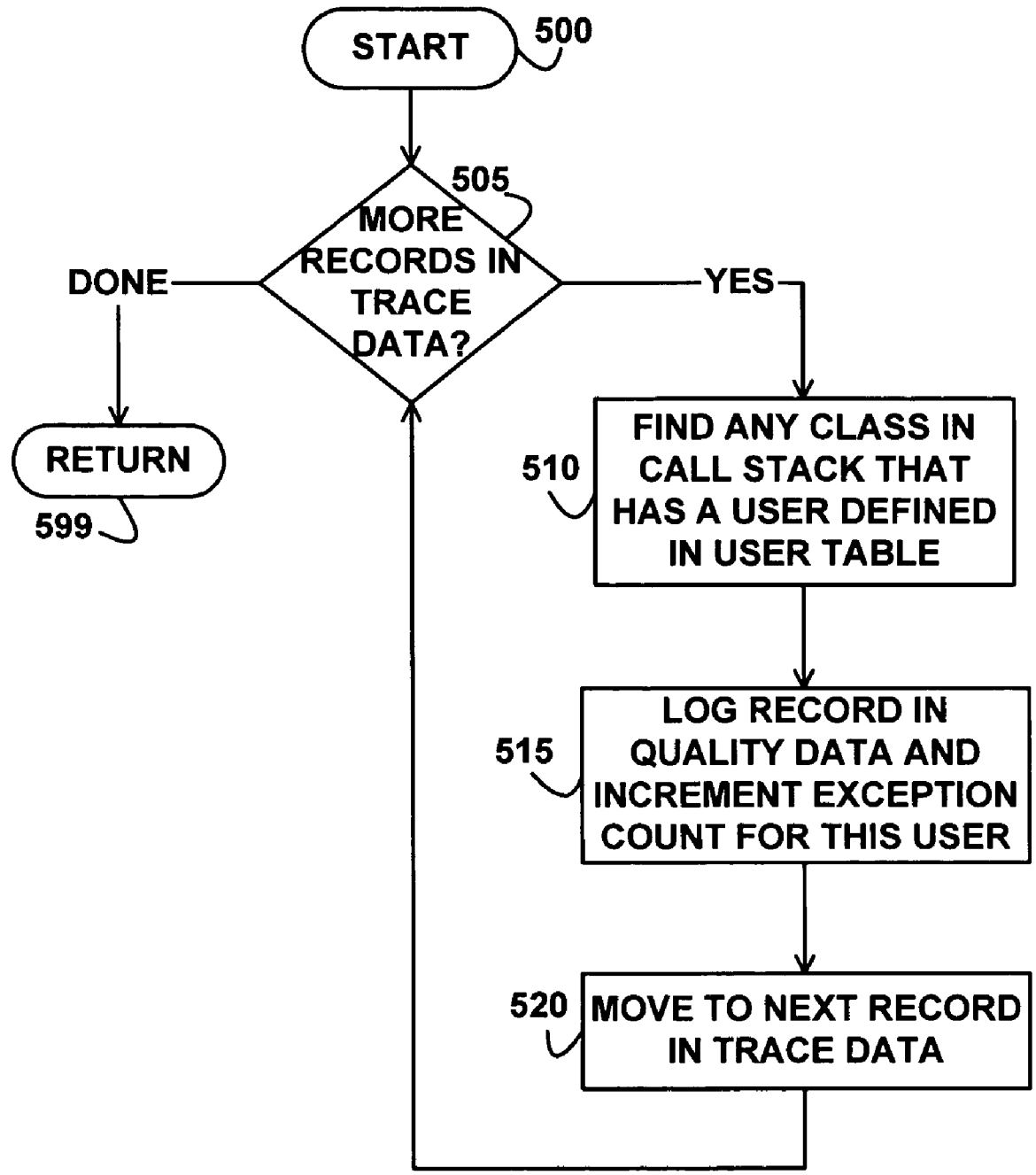
FIG. 5 depicts a flowchart of example processing for a query program, according to an embodiment of the invention.

FIG. 5 depicts a flowchart of example processing for the query program 154, according to an embodiment of the invention. Control begins at block 500. Control then continues to block 505 where the query program 154 determines whether another record that is unprocessed by the logic of FIG. 5 exists in the trace data 152. If the determination at block 505 is true, then a record unprocessed by the logic of FIG. 5 exists in the trace data 152, so control continues to block 510 where the query program 154 finds any class in the call stack 220 (FIG. 2) of the current record in the trace data 152 that is owned by a user defined in the user data 156. Control then continues to block 515 where the query program 154 creates a record in the quality data 158 if a record does not already exist for the user and exception, logs the user that owns the class into the user ID 320, and initializes the count 330 in the newly created record to one. If a record already exists for the user and exception, then the query program 154 increments the count 330 in the already existing record in the quality data 158. Control then continues to block 520 where the query program 154 moves to the next record in the trace data 152. Control then returns to block 505, as previously described above.

If the determination at block 505 is false, then all records in the trace data 152 have been processed by the logic of FIG. 5, so control continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    logging trace data in response to an exception, wherein the trace data comprises a call stack of an application that generated the exception at a time that the exception occurred, wherein the application comprises a plurality of linked methods, and wherein the call stack comprises a plurality of entries for the linked methods and information that describes a plurality of classes of the linked methods at the time that the exception occurred, wherein the linked methods are linked as a result of the linked methods calling each other within a same process;
    finding a first class that generated the exception in the call stack; and
    creating quality data from the trace data if the first class in the call stack is owned by a user defined in a user table, wherein the creating further comprises creating a count of a number of times the exception was encountered by the application while the first class that generated the exception was owned by the user, wherein the quality data comprises an identification of the user, the count, and an identification of the exception.

2. The method of claim 1, wherein the logging further comprises:
    logging the trace data if the exception meets a filter criteria.

3. The method of claim 2, wherein the filter criteria comprises an exception type.

4. An apparatus comprising:
    means for logging trace data in response to an exception if the exception meets a filter criteria, wherein the trace data comprises a call stack of an application that generated the exception at a time that the exception occurred, wherein the application comprises a plurality of linked methods, and wherein the call stack comprises a plurality of entries for the linked methods and information that describes a plurality of classes of the linked methods at the time that the exception occurred, wherein the linked methods are linked as a result of the linked methods calling each other within a same process;
    means for finding a first class that generated the exception in the call stack; and
    means for creating quality data from the trace data if the first class in the call stack is owned by a user defined in a user table, wherein the means for creating further comprises means for creating a count of a number of times the exception was encountered by the application while the first class that generated the exception was owned by the user, wherein the quality data comprises an identification of the user, the count, and an identification of the exception.

5. The apparatus of claim 4, wherein the filter criteria comprises an exception type.

6. The apparatus of claim 4, wherein the filter criteria comprises classes that initiate the exception.

7. A signal-bearing medium encoded with instructions, wherein the instructions when executed comprise:
    logging trace data in response to an exception if the exception meets a filter criteria, wherein the trace data comprises a call stack of an application that generated the exception at a time that the exception occurred, wherein the application comprises a plurality of linked methods, and wherein the call stack comprises a plurality of entries for the linked methods and information that describes a plurality of classes of the linked methods at the time that the exception occurred, wherein the linked methods are linked as a result of the linked methods calling each other within a same process;

finding a first class that generated the exception in the call stack; and creating quality data from the trace data if the first class in the call stack is owned by a user defined in a user table, wherein the creating further comprises creating a count of a number of times the exception was encountered by the application while the first class that generated the exception was owned by the user, wherein the quality data comprises an identification of the user, the count, and an identification of the exception.

8. The signal-bearing medium of claim 7, wherein the filter criteria comprises an exception type.

9. The signal-bearing medium of claim 8, wherein the filter criteria comprises classes that initiate the exception.

10. The signal-bearing medium of claim 9, wherein the filter criteria comprises packages that contain the classes that initiate the exception.

11. A computer system comprising:
a processor; and
memory encoded with instructions, wherein the instructions when executed on the processor comprise:
logging trace data in response to an exception if the exception meets a filter criteria, wherein the trace data comprises a call stack of an application that generated the exception at a time that the exception occurred, wherein the application comprises a plurality of linked methods, and wherein the call stack comprises a plurality of entries for the linked methods and information that describes a plurality of classes of the linked methods at the time that the exception occurred, wherein the linked methods are linked as a result of the linked methods calling each other within a same process, finding a first class that generated the exception in the call stack, and creating quality data from the trace data if the first class in the call stack is owned by a user defined in a user table, wherein the creating further comprises creating a count of a number of times the exception was encountered by the application while the first class that generated the exception was owned by the user, wherein the quality data comprises an identification of the user, the count, and an identification of the exception.

12. The computer system of claim 11, wherein the filter criteria comprises an exception type.

13. The computer system of claim 11, wherein the filter criteria comprises classes that initiate the exception.

14. The computer system of claim 11, wherein the filter criteria comprises packages that contain the classes that initiated the exception.

* * * * *